US007054981B2

(12) United States Patent
Fadell et al.

(10) Patent No.: US 7,054,981 B2
(45) Date of Patent: May 30, 2006

(54) METHODS AND APPARATUS FOR PROVIDING AUTOMATIC HIGH SPEED DATA CONNECTION IN PORTABLE DEVICE

(75) Inventors: Anthony M. Fadell, Portola Valley, CA (US); Christoph Krah, San Jose, CA (US)

(73) Assignee: Apple Computer, Inc., Cupertino, CA (US)

( * ) Notice: Subject to any disclaimer, the term of this patent is extended or adjusted under 35 U.S.C. 154(b) by 389 days.

(21) Appl. No.: 10/179,814

(22) Filed: Jun. 24, 2002

(65) Prior Publication Data

US 2004/0117518 A1    Jun. 17, 2004

Related U.S. Application Data

(60) Provisional application No. 60/348,746, filed on Oct. 22, 2001.

(51) Int. Cl.
*G06F 13/14* (2006.01)

(52) U.S. Cl. .......................................... 710/305; 710/27

(58) Field of Classification Search ............ 710/22–28, 710/308, 316, 38, 305, 306, 317
See application file for complete search history.

(56) References Cited

U.S. PATENT DOCUMENTS

| 4,975,832 A * | 12/1990 | Saito et al. ................... 710/23 |
| 5,187,425 A | 2/1993 | Tanikawa ..................... 320/31 |
| 5,287,053 A | 2/1994 | Hutchinson ................... 320/2 |
| 5,477,126 A | 12/1995 | Shiojima ...................... 320/35 |
| 5,617,009 A | 4/1997 | Takao et al. .................. 320/23 |
| 5,737,634 A * | 4/1998 | Hamano et al. ............... 710/27 |
| 5,828,856 A * | 10/1998 | Bowes et al. ................ 710/308 |
| 6,034,508 A | 3/2000 | Chang ......................... 320/138 |
| 6,078,742 A * | 6/2000 | Chow .......................... 703/25 |
| 6,249,833 B1 * | 6/2001 | Takahashi .................... 710/308 |
| 6,377,530 B1 * | 4/2002 | Burrows ................... 369/59.21 |
| 6,477,482 B1 * | 11/2002 | Maupin et al. ............. 702/183 |
| 6,658,520 B1 * | 12/2003 | Bennett ....................... 710/312 |
| 6,701,405 B1 * | 3/2004 | Adusumilli et al. ........ 710/308 |
| 6,718,405 B1 * | 4/2004 | Rogers ......................... 710/22 |
| 6,804,263 B1 * | 10/2004 | Okawa ......................... 370/489 |

FOREIGN PATENT DOCUMENTS

| JP | 59103121 | 6/1984 |
| JP | 2000155738 | 6/2000 |
| WO | WO 0167457 | * 9/2001 |

* cited by examiner

OTHER PUBLICATIONS

International Search Report from corresponding PCT application PCT/US02/33567.

*Primary Examiner*—Tim Vo
*Assistant Examiner*—Trisha Vu
(74) *Attorney, Agent, or Firm*—Beyer Weaver & Thomas, LLP

(57) ABSTRACT

In a portable FireWire compatible device, a direct memory access (DMA) bus switch coupled by way of a DMA bus to a central processing unit (CPU), a local hard drive (HDD), and a FireWire port, provides a direct connection between the FireWire port and the HDD bypassing a main bus and the CPU when a data transfer request is received and processed by the CPU. Otherwise, until the data transfer request is received and processed, the CPU is directly connected to the HDD. In this way, a high speed data transfer between the FireWire port and the HDD is provided only when an appropriate data transfer request is received and processed.

19 Claims, 4 Drawing Sheets

METHODS AND APPARATUS FOR PROVIDING AUTOMATIC HIGH SPEED DATA CONNECTION IN PORTABLE DEVICE

This application claims benefit of Provisional Application No. 60/348,746 filed Oct. 22, 2001.

BACKGROUND OF THE INVENTION

1. Field of Invention

This invention relates generally to computing systems. Specifically, a method and apparatus for providing a direct connection between a FireWire connected external memory source and a local hard drive in order to facilitate a high speed data transfer in a portable FireWire enabled device is described.

2. Description of Related Art

FireWire is a IEEE1394 compliant High Performance Serial Bus that provides two types of data transfer: asynchronous and isochronous. Asynchronous is for traditional load-and-store applications where data transfer can be initiated and an application interrupted as a given length of data arrives in a buffer. Isochronous data transfer ensures that data flows at a pre-set rate so that an application can handle it in a timed way while providing the bandwidth needed for audio, imaging, video, and other streaming data. Isochronous service means it guarantees latency or the length of time between a requested action and when the resulting action occurs which is a critical feature in supporting real time video, for example. FireWire provides a high-speed serial bus with data transfer rates of 100, 200, or 400 Mbps as well as a single plug-and-socket connection on which up to 63 devices can be attached with data transfer speeds up to 400 Mbps (megabits per second). In this way, FireWire offers a standard, simple connection to all types of consumer electronics, including digital audio devices, digital VCRs and digital video cameras; as well as to traditional computer peripherals such as optical drives and hard disk drives. The standard Firewire cable consists of six wires in which data is sent via two separately-shielded twisted pair transmission lines that are crossed in each cable assembly to create a transmit-receive connection. Two more wires carry power (8 to 28 v, 1.5 A max.) to remote devices. In some cases, such as with DV camcorders manufactured by the Sony Corporation of Japan, a four conductor FireWire cable is used (configured as the 6 wire cable but without the power wires) that terminate in smaller, 4 prong connectors. To connect a four prong device, such as the Sony DV camcorder with a standard IEE1394 Firewire device or interface card, an adapter cable is required having 4 prongs on one side and 6 on the other. In this way, the data lines are connected while omitting the power connection. Currently, portable FireWire enabled multimedia devices (such as MP3 players, and the like) are limited by the ability to transfer large data files directly from a FireWire connected external memory storage medium and a local hard drive (HDD) since the FireWire must communicate with the HDD by way of a main bus. In such situations, the high speed data transfer capabilities inherent in a FireWire cable can not be reached.

Therefore, what is required is a method and apparatus for providing a direct connection between a FireWire connected external memory source and a local hard drive in order to facilitate a high speed data transfer in a portable FireWire enabled device.

SUMMARY OF THE INVENTION

According to the present invention, methods, apparatus, and systems are disclosed for providing a cascadable state machine for broadcast content is disclosed.

In one embodiment, an apparatus for providing a direct connection between an external memory source and a local hard drive in order to facilitate a high speed data transfer in a system that includes a central processing unit (CPU) connected to a main system bus is disclosed. The apparatus includes a direct memory access (DMA) bus, a local hard drive (HDD) coupled to the DMA bus, a port receptor connected to the DMA bus arranged to receive an external connector, and a direct memory access bus switch coupled by way of the DMA bus to the CPU. In the described embodiment, the switch that provides a direct connection between the port receptor and the HDD by way of the DMA bus only thereby bypassing the main system bus and the CPU when an appropriate data transfer request is received and processed by the CPU. In this way the high speed data transfer between the port receptor and the HDD is provided only when the appropriate data transfer request is received and processed by the CPU.

In another embodiment, a method for providing a direct connection between an external memory source and a local hard drive in order to facilitate a high speed data transfer in a system that includes a central processing unit (CPU) connected to a main system bus is described. A direct memory access (DMA) bus is provided after which a local hard drive (HDD) is connected to the DMA bus. A port receptor arranged to receive an external connector is connected to the DMA bus. A direct memory access bus switch bus is coupled to the CPU by way of the DMA such that only when an appropriate data transfer request is received and processed by the CPU, a direct connection is provided between the port receptor and the HDD by way of the DMA bus only thereby bypassing the main system bus and the CPU such that the high speed data transfer is provided between the port receptor and the HDD.

In yet another embodiment, an apparatus for providing a direct connection between an external memory source and a local hard drive in order to facilitate a high speed data transfer in a system that includes a central processing unit (CPU) connected to a main system bus is described. The apparatus includes means for providing a direct memory access (DMA) bus, means for coupling a local hard drive (HDD) to the DMA bus, means for connecting a port receptor to the DMA bus arranged to receive an external connector, means for coupling a direct memory access bus switch bus to the CPU by way of the DMA. Only when an appropriate data transfer request is received and processed by the CPU, means for providing a direct connection between the port receptor and the HDD by way of the DMA bus only thereby bypassing the main system bus and the CPU, and means for providing the high speed data transfer between the port receptor and the HDD.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In a portable FireWire compatible device, a direct memory access (DMA) bus switch coupled by way of a DMA bus to a central processing unit (CPU), a local hard drive (HDD), and a FireWire port, provides a direct connection between the FireWire port and the HDD bypassing a main bus and the CPU when a data transfer request is received and processed by the CPU. Otherwise, until the data transfer request is received and processed, the CPU is directly connected to the HDD. In this way, a high speed data transfer between the FireWire port and the HDD is provided only when an appropriate data transfer request is received and processed.

The invention will now be described in terms a DMA switch suitable for providing a high speed data transfer path between a FireWire port and a local HDD in any FireWire compatible device. Such devices include, for example, personal digital assistants, personal MP3 player/recorders, and the like.

Figure 1:
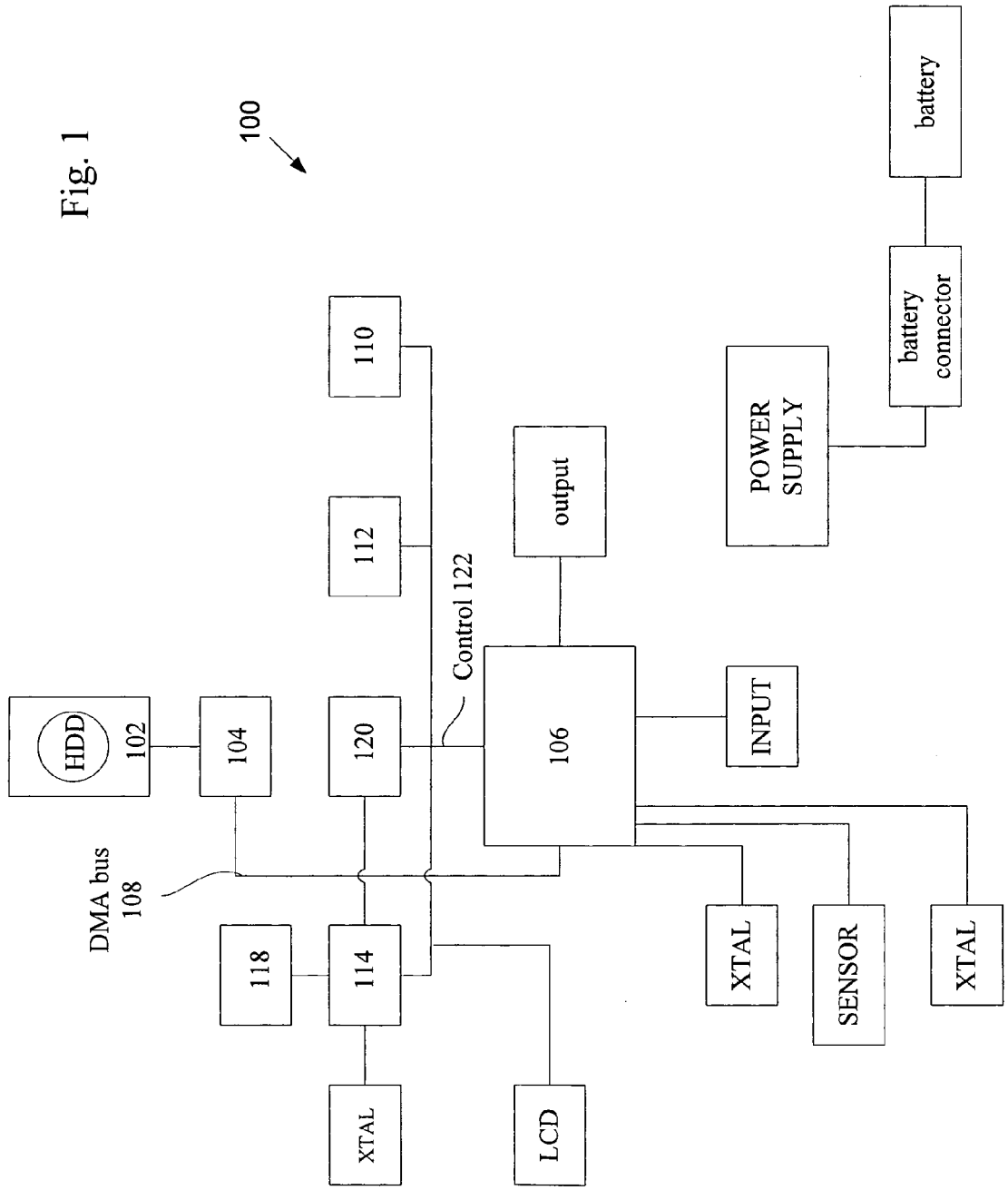
FIG. 1 shows an exemplary portable FireWire enabled multimedia device in accordance with an embodiment of the invention.

Accordingly, FIG. 1 shows an exemplary portable FireWire enabled multimedia device 100 in accordance with an embodiment of the invention. The device 100 includes a local hard drive (HDD) 102 coupled by way of an HDD connector 104 to a central processing unit (CPU) 106 by way of a DMA bus 108. The CPU 106 is, in turn connected to any number of devices, such as SDRAM 110, Flash ROM 112, and a FireWire physical link 114 by way of a main bus 116. In the described embodiment, the physical link 114 provides an interface between a FireWire standard connector 118 (also referred to as a FireWire port) and the DMA bus 108 which connects a DMA bus switch unit 120 to the physical link 114.

Figure 2:
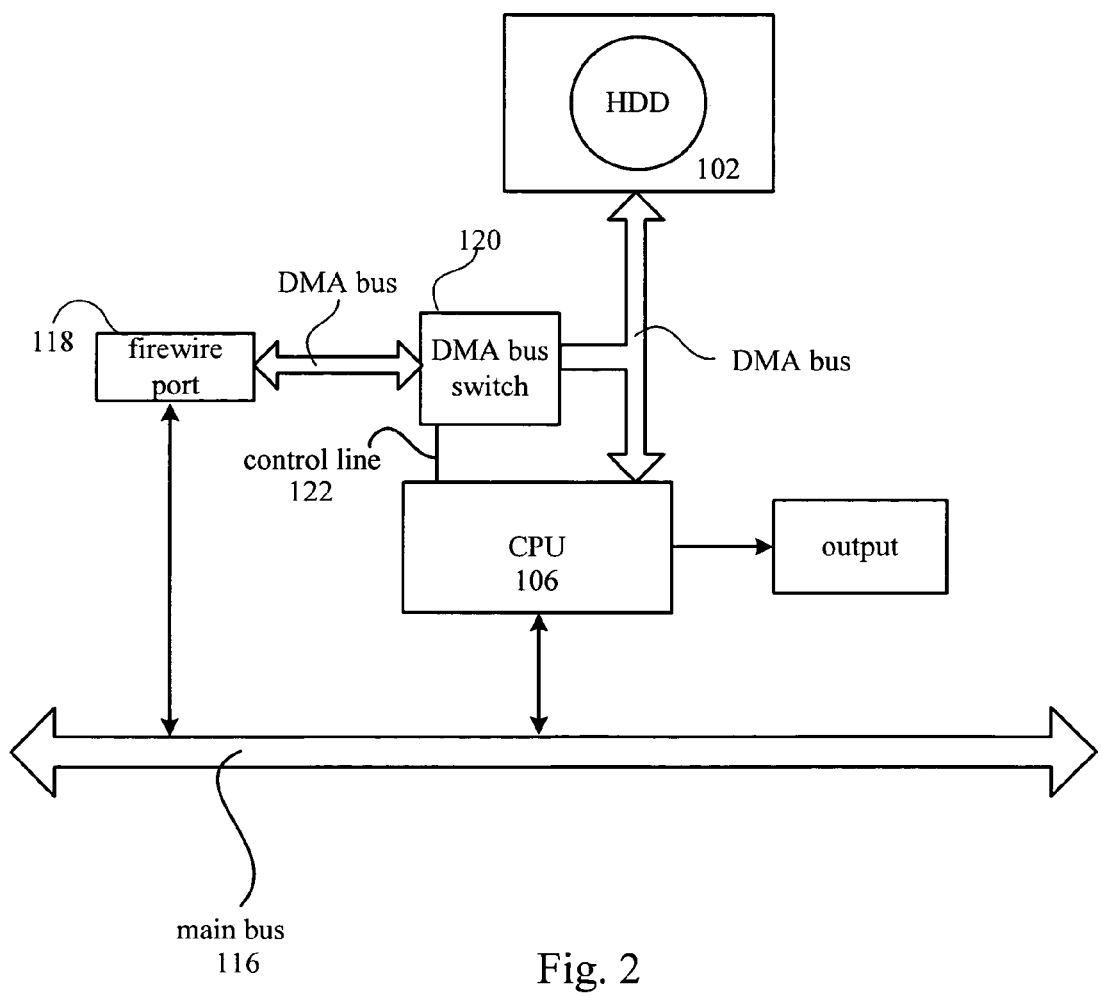
FIG. 2 shows a simplified schematic of a portion of the FireWire enabled multimedia device shown in FIG. 1.

FIG. 2 shows a simplified schematic of a portion of the FireWire enabled multimedia device 100 shown in FIG. 1 useful in illustrating the situation when a data transfer request is received the CPU 106. The CPU 106 processes the request by determining if a FireWire cable (not shown) is connected to the standard connector 118 and if so, sends a switch signal by way of a control line 122 to the DMA bus switch 120. The DMA bus switch 120 responds to the switch signal by providing a direct data transfer path between the port 118 and the HDD 102 so as to avoid transferring data by way of the main bus 116. In this way a high speed data transfer between an external memory source connected by way of a FireWire cable to the port 118 and the HDD 102. In those cases where the FireWire cable in not connected, then the device is in what is referred to as portable mode and the DMA bus switch 120 is inactive thereby preserving power resources.

Figure 3:
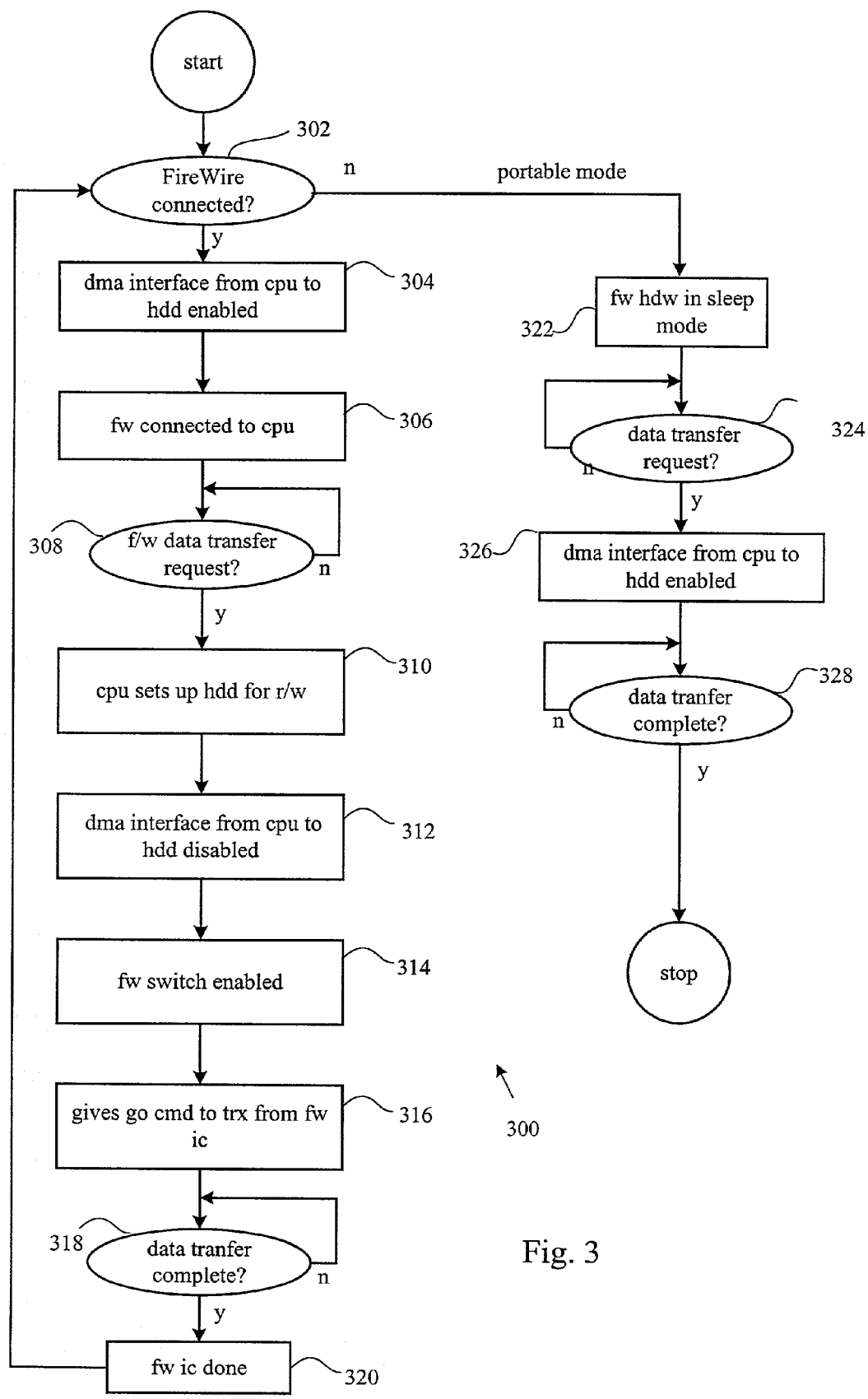
FIG. 3 shows a flowchart detailing a process for providing a high speed data transfer path between a FireWire port and a local HDD in accordance with an embodiment of the invention.

FIG. 3 shows a flowchart detailing a process 300 for providing a high speed data transfer path between a FireWire port and a local HDD in accordance with an embodiment of the invention. Accordingly, the process 300 begins at 302 by determining whether or not a FireWire cable is connected to the device, if so, then a DMA interface between the CPU and the HDD is enabled at 304. At 306, the FireWire cable is connected to the CPU queries at 308 whether or not a data transfer request has been received. When a data request has been received, the CPU sets up the HDD for a data transfer (i.e., a read/write operation) at 310 and the DMA interface between the CPU and the HDD is disabled at 312 substantially simultaneously with, at 314, the FireWire DMA switch being enabled. A control circuit then provides a data transfer initiate signal at 316 for the data transfer to begin while at 318 a query is made by the control circuit whether or not the data transfer has completed. When the data transfer has completed at 320, control is passed back to 302.

Returning to 302, if it has been determined that the FireWire cable is not connected, then the device is in portable mode and the FireWire circuits are in sleep mode at 322. At 324, if a data transfer request has been received, then the DMA interface between the CPU and the HDD is enabled at 326 and a data transfer takes place until it is determined at 328 to be complete at which time the process 300 stops normally.

Figure 4:
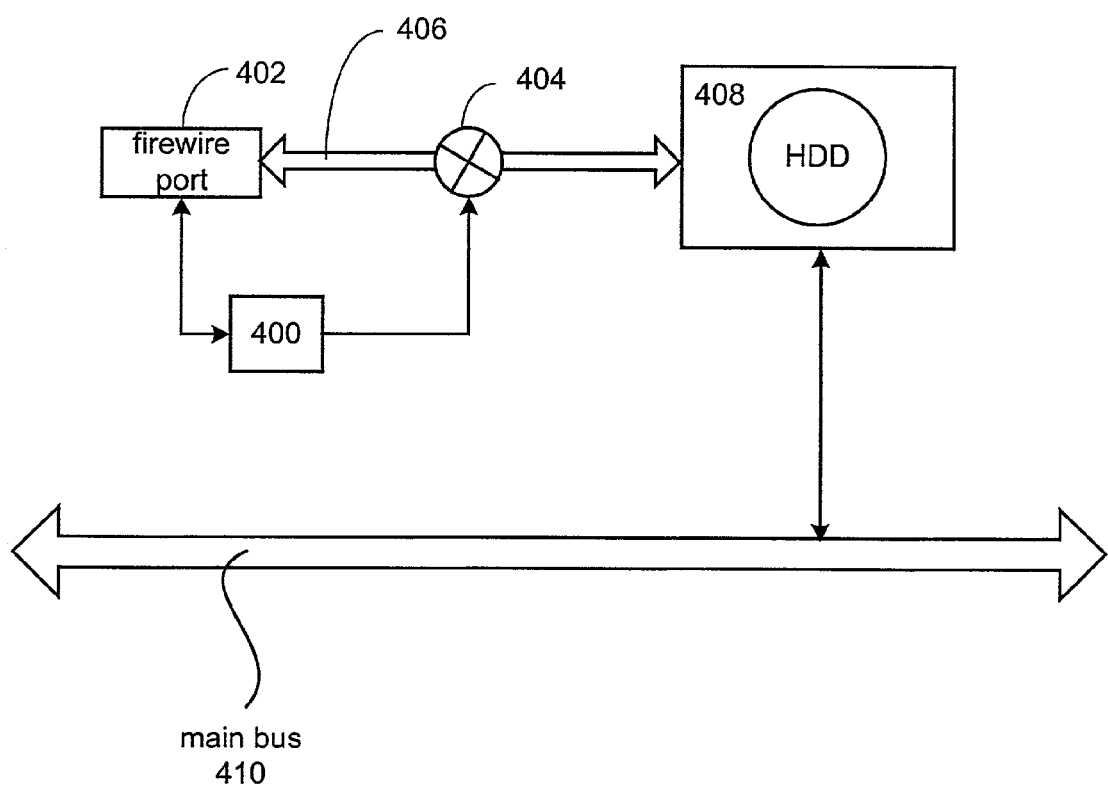
FIG. 4 shows another embodiment of the invention.

In another embodiment of the invention shown in FIG. 4, a FireWire detection circuit 400 detects whether or not a FireWire cable is connected to the FireWire port 402. In those cases when a FireWire cable is connected to the port 402, a data transfer circuit 404 coupled to a DMA bus 406 directly connects an HDD 408 to the FireWire cable bypassing a main bus 410 so as to provide a high speed data path between an external device coupled to the FireWire cable and the HDD 408.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

The invention claimed is:

1. An apparatus for providing a direct connection between an external memory source and a local hard drive in order to facilitate a high speed data transfer in a system that includes a central processing unit (CPU) always connected to a main system bus, comprising:

a direct memory access (DMA) bus;

a local hard drive (HDD) coupled to the DMA bus;

a port receptor connected to the DMA bus arranged to receive an external connector;

a high speed serial cable detection circuit for detecting if a high speed serial cable is connected to the port receptor and wherein, when the high speed serial cable detected, the high speed serial cable detection circuit generates and forwards a high speed data transfer request to the CPU;

a direct memory access bus switch coupled by way of the DMA bus to the CPU that provides a direct connection between the port receptor and the HDD by way of the DMA bus wherein when the direct memory access bus switch provides the direct connection between the port receptor and the HDD by way of the DMA bus, the CPU is unable to access the HDD.

2. An apparatus as recited in claim 1, further comprising:
until the direct memory access bus switch provides the direct connection between the port receptor and the HDD by way of the DMA bus, the CPU is directly connected to the HDD.

3. An apparatus as recited in claim 1, wherein the port receptor is a Fire Wire port receptor.

4. An apparatus as recited in claim 1, wherein the apparatus is incorporated into a portable Fire Wire enabled device.

5. A method for providing a direct connection between an external memory source and a local hard drive in order to facilitate a high speed data transfer in a system that includes a central processing unit (CPU) always connected to a main system bus, comprising:
providing a direct memory access (DMA) bus;
coupling a local hard drive (HDD) to the DMA bus;
connecting a port receptor to the DMA bus arranged to receive an external connector; circuit generates and forwards a high speed data transfer request to the CPU;
coupling a direct memory access bus switch to the CPU by way of the DMA;
only when an appropriate data transfer request is received and processed by the CPU, providing a direct connection between the port receptor and the HDD by way of the DMA bus during which the CPU is unable to access the HDD.

6. A method as recited in claim 5, further comprising:
directly connecting the CPU to the HDD until the appropriate data transfer request is received and processed by the CPU.

7. A method as recited in claim 5, wherein the port receptor is a Fire Wire port receptor.

8. A method as recited in claim 5, wherein the system is incorporated into a portable Fire Wire enabled device.

9. An apparatus for providing a direct connection between an external memory source and a local hard drive in order to facilitate a high speed data transfer in a system that includes a central processing unit (CPU) always connected to a main system bus, comprising:
means for providing a direct memory access (DMA) bus;
means for coupling a local hard drive (HDD) to the DMA bus;
means for connecting a port receptor to the DMA bus arranged to receive an external connector;
means for detecting if a high speed serial cable is connected to the port receptor and wherein, when the high speed serial cable detected, the means for detecting generates and forwards a high speed data transfer request to the CPU;
means for coupling a direct memory access bus switch bus to the CPU by way of the DMA;
means for providing a direct connection between the port receptor and the HDD by way of the DMA bus only thereby bypassing the main system bus and the CPU such that the CPU is unable to access the HDD.

10. An apparatus as recited in claim 9, further comprising:
means for directly connecting the CPU to the HDD until the appropriate data transfer request is received and processed by the CPU.

11. An apparatus as recited in claim 9, wherein the port receptor is a Fire Wire port receptor.

12. An apparatus as recited in claim 9, wherein the system is incorporated into a portable Fire Wire enabled device.

13. In a system that includes a central processing unit (CPU) always connected to a main system bus, an apparatus for providing a direct high speed data transfer connection between an external device having an external device connector and a local memory comprising:
a direct memory access (DMA) bus connected to the local memory;
a port receptor connected to the DMA bus arranged to receive the external device connector;
a high speed serial cable detection circuit for detecting if a high speed serial cable is connected to the port receptor and wherein, when the high speed serial cable detected, the high speed serial cable detection circuit generates and forwards a high speed data transfer request to the CPU; and
a direct memory access bus switch that provides the direct high speed data transfer connection between the port receptor and the local memory as directed by the CPU based upon the high speed data transfer request, wherein when the direct memory access bus switch provides the direct connection between the port receptor and the local memory, the CPU is unable to access the local memory.

14. An apparatus as recited in claim 13, wherein the high speed cable is an IEEE 1394 compliant cable.

15. An apparatus as recited in claim 13, wherein the local memory is selected from a group comprising: an SDRAM device, a Flash ROM device, an EPROM device, and a hard disk drive (HDD).

16. In a system that includes a central processing unit (CPU) connected to a main system bus and a local memory connected to a DMA bus, a method for providing a direct high speed data transfer connection between a port receptor and the local memory, comprising:
detecting a high speed cable connected at the port receptor connected to the DMA bus;
generating a high speed data transfer request when the high speed cable is detected;
providing the direct high speed data transfer connection between the local memory and the port receptor via the DMA bus based upon the high speed data transfer request; and
disabling access between the CPU and the local memory.

17. A method as recited in claim 16, wherein the local memory is a hard disk drive (HDD).

18. A method as recited in claim 16, wherein the port receptor is an IEEE 1394 compliant port receptor.

19. A method as recited in claim 16, wherein the local memory is selected from a group comprising: an SDRAM device, a Flash ROM device, and an EPROM device.

* * * * *

UNITED STATES PATENT AND TRADEMARK OFFICE
CERTIFICATE OF CORRECTION

| | | |
|---|---|---|
| PATENT NO. | : 7,054,981 B2 | Page 1 of 1 |
| APPLICATION NO. | : 10/179814 | |
| DATED | : May 30, 2006 | |
| INVENTOR(S) | : Fadell et al. | |

It is certified that error appears in the above-identified patent and that said Letters Patent is hereby corrected as shown below:

In the Claims:

(column 5, line 19) insert --detecting by a high speed serial cable detection circuit if a high speed serial cable is connected to the port receptor and wherein, when the high speed serial cable detected, the high speed serial cable detection-- before "circuit".

(column 6, line 42) insert --serial-- after "speed".

(column 6, line 45) insert --serial-- after "speed".

Signed and Sealed this

Twenty-sixth Day of December, 2006

JON W. DUDAS
*Director of the United States Patent and Trademark Office*